United States Patent
Schreder et al.

(10) Patent No.: US 6,317,638 B1
(45) Date of Patent: *Nov. 13, 2001

(54) MULTI-LAYER STATE MACHINE FOR A HYBRID REAL-TIME CONTROL SYSTEM AND METHOD OF OPERATION THEREOF

(75) Inventors: James M. Schreder, Denver, PA (US); Jurgen Rudnick, Hanau (DE); Paul F. McLaughlin, Hatfield, PA (US); Pankaj H. Mody, Laguna Niguel, CA (US)

(73) Assignee: Honeywell Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,266

(22) Filed: Aug. 22, 1997

(51) Int. Cl.⁷ .................................................. G05B 13/02
(52) U.S. Cl. .................................... 700/79; 700/2; 700/6; 700/20; 700/21
(58) Field of Search .................. 395/800.32, 800.39, 395/800.4, 740, 734, 672, 746; 712/32, 39, 40; 714/769, 802, 815, 825

(56) References Cited

U.S. PATENT DOCUMENTS

| | | | |
|---|---|---|---|
| 4,604,744 | * | 8/1986 | Littlebury et al. .................. 371/22.1 |
| 4,866,421 | * | 9/1989 | Szczepanek ..................... 340/825.52 |

(List continued on next page.)

OTHER PUBLICATIONS

Orihara et al., "An Automated Decentralized System Platform Under Multi-Vendor Environments in Building Automation", Proceedings of the Third International Symposium on Autonomous Decentralized Systems, IEEE, pp. 409–415, Apr. 9–11, 1997.*

H. A. Barker, "Open Environments and Object–Oriented Methods: The Way Forward in Computer–Aided Control System Design", Proceedings of the IEEE/IFAC Joint Symposium on Computer–Aided Control System Design, pp. 3–12, Mar. 7–9, 1994.*

Klein I, et al: "Automatic Creation of Sequential Control Systems in Polynomial Time" Proceedings of the Conference on Decision and Control, San Antonio, Dec. 15–17, 1993, pp. 211–216, XP000457741. Institute of Electrical and Electronics Engineers, p. 212, right–hand col., paragraph 2; p. 212, left–hand col., paragraph 2, Figure 1.

Zaytoon J: "Specification and Design of Logic Controllers for Automated Manufacturing Systems" Robotics and Computer Integrated Manufacturing, vol. 12, No. 4, Dec. 1996, p. 353–366 XP004016029, p. 355, left–hand col., last paragraph.

Laskowski M, et al: "Problembezogene Synthese Von Sequentiellen Steuerungsprogrammen" Automatisierungstechnische Praxis—ATP, vol. 32, No. 9, Sep. 1, 1990, pp. 455–459, XP000159211 p. 456, right–hand col., paragraph 2; p. 458, left–hand col., last paragraph; figures 1,2.

Primary Examiner—William M. Treat
(74) Attorney, Agent, or Firm—Hitt Gaines & Boisbrun

(57) ABSTRACT

Various system architectures for a state machine-based, hybrid real-time control system, and methods of operation thereof, are disclosed. In one embodiment of a system architecture for use with a state machine capable of controlling a real-time process and having a plurality of states and handlers that govern transitions between ones of the plurality of states, a system for invoking one of the handlers includes an invoke transition that monitors conditions of the real-time process, the invoke transition causing the automatic invocation of the handler when the conditions match predetermined conditions under which the handler is to be invoked, the invoke transition thereby allowing the handler to be invoked without an explicit command.

42 Claims, 3 Drawing Sheets

U.S. PATENT DOCUMENTS

| | | | |
|---|---|---|---|
| 5,175,679 | * 12/1992 | Allen et al. | 364/148 |
| 5,220,668 | * 6/1993 | Bullis | 395/672 |
| 5,355,484 | * 10/1994 | Record et al. | 395/650 |
| 5,361,389 | * 11/1994 | Fitch | 395/527 |
| 5,398,336 | * 3/1995 | Tantry et al. | 700/103 |
| 5,461,573 | * 10/1995 | Chakradhar et al. | 364/489 |
| 5,495,595 | * 2/1996 | Peters et al. | 709/300 |
| 5,602,761 | * 2/1997 | Spoerre et al. | 702/179 |
| 5,659,721 | * 8/1997 | Shen et al. | 395/569 |
| 5,734,910 | * 3/1998 | Corrigan et al. | 395/734 |
| 5,802,378 | * 9/1998 | Arndt et al. | 395/740 |
| 5,963,447 | * 10/1999 | Kohn et al. | 700/49 |
| 6,003,129 | * 12/1999 | Song et al. | 712/244 |

* cited by examiner

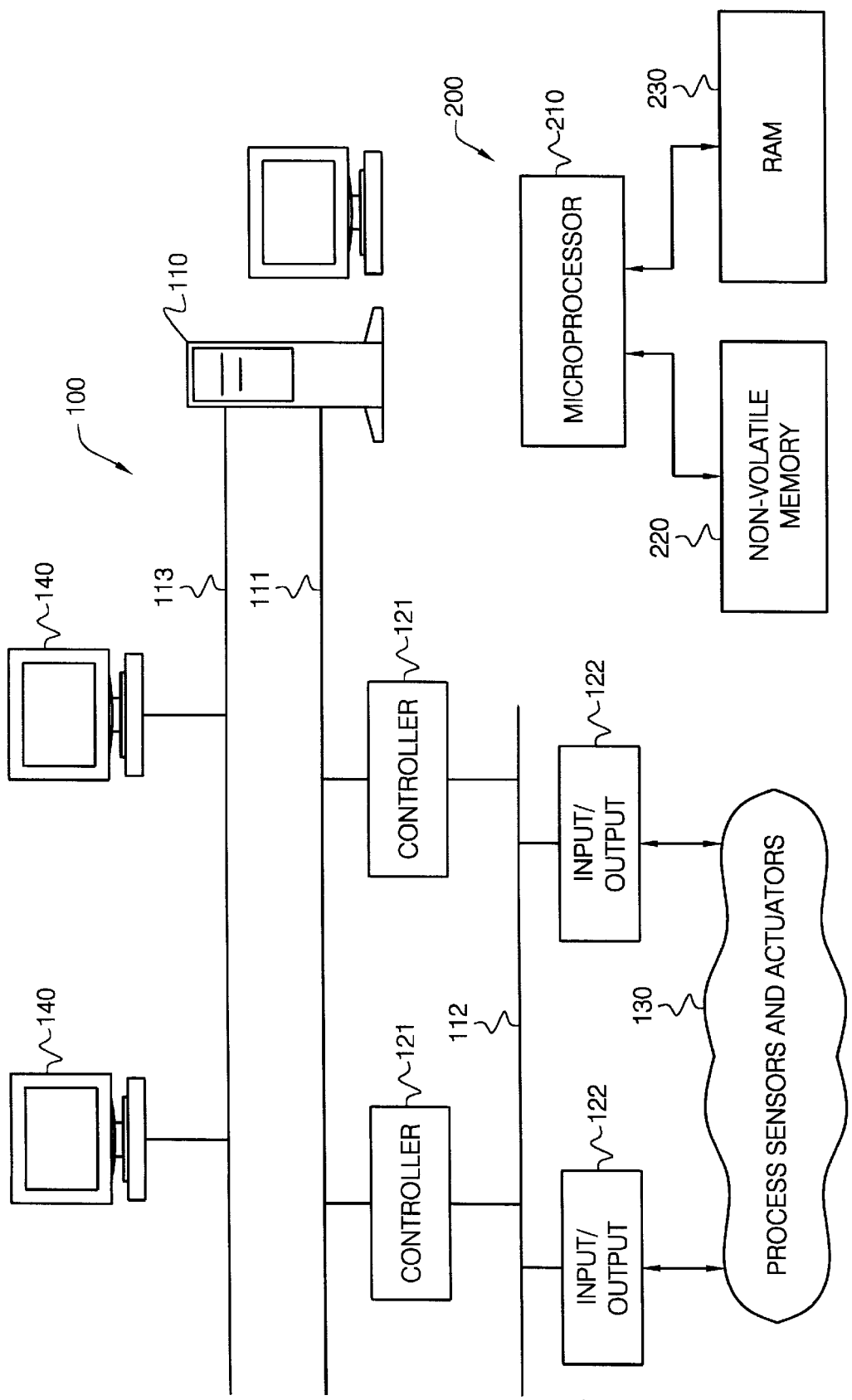

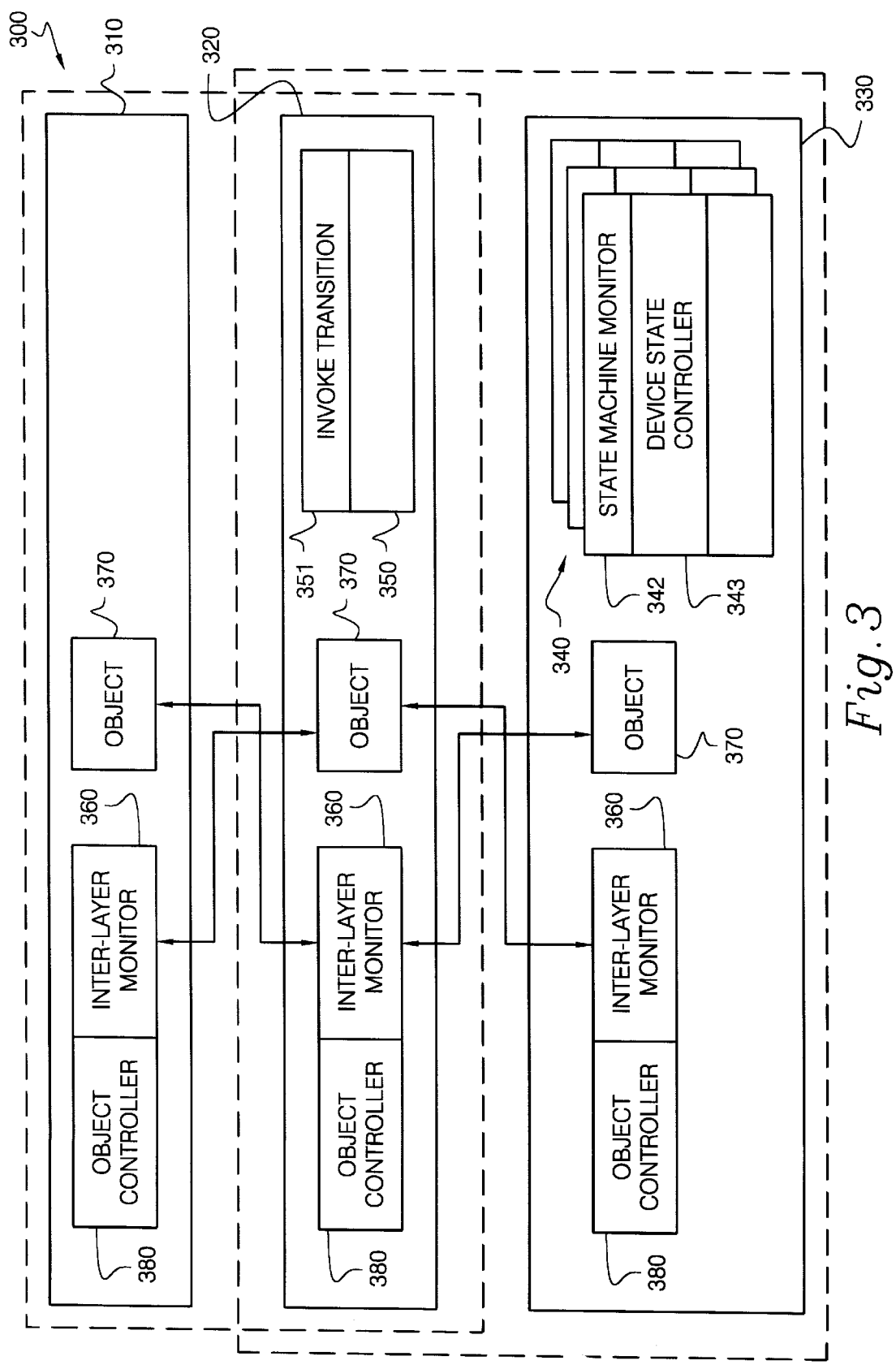

MULTI-LAYER STATE MACHINE FOR A HYBRID REAL-TIME CONTROL SYSTEM AND METHOD OF OPERATION THEREOF

TECHNICAL FIELD OF THE INVENTION

The present invention is directed, in general, to computing and processing systems and, more specifically, to various system architectures for a state-machine-based, hybrid real-time control system, and methods of operation thereof.

BACKGROUND OF THE INVENTION

Automated plant control systems include a comprehensive set of algorithms, or software-definable process control routines, to control and monitor various processes within, for instance, a manufacturing facility. The control systems can be tailored to satisfy a wide range of process requirements globally or within specified portions of the facility. Conventionally, the control systems include a variety of modules, each having its own processor or firmware, linked together by communication buses to result in a distributed process control system. The distributed nature of the system affords high performance with the capability to expand the system incrementally to satisfy growth or modifications in the facility.

In order to allow a user to tailor a process control system to a particular processing environment, it is important to provide such systems with highly-configurable and adaptable systems. Process control systems generally provide a means by which users can create custom control strategies, e.g., software-definable process control routines. In object-oriented programming environments, a complete control strategy may be built from smaller components, such as "blocks" and "parameters." A block is a software construct, or "object," used to encapsulate the data and the algorithms of elemental control computations; parameters define the interface to individual pieces of data within a block. Although conventional object-oriented process control systems do provide a user with some means of tailoring a system to their particular needs, conventional process control systems are still evolving toward systems that are high-configurable and flexible to meet the specific requirements of a broad range of processing environments.

Therefore, what is needed in the art are more powerful and flexible architectural features for distributed real-time process control systems.

SUMMARY OF THE INVENTION

To address the above-discussed deficiencies of the prior art, it is a primary object of the present invention to provide more powerful and flexible architectural features for distributed real-time process control systems.

In the attainment of the above primary object, the present invention provides various system architectures for a state machine-based, hybrid real-time control system and methods of operation thereof. In one embodiment, for use with a state machine capable of controlling a real-time process and having a plurality of states and handlers that govern transitions between ones of the plurality of states, a system for invoking one of the handlers includes an invoke transition that monitors conditions of the real-time process, the invoke transition causing the automatic invocation of the handler when the conditions match a predetermined condition under which the handler is to be invoked, the invoke transition thereby allowing the handler to be invoked without an explicit command. The invoke transition may be contained within a transition block of the one of the handlers and may be embodied in a sequence of instructions executable in data processing and storage circuitry.

In another embodiment, for use with a state machine capable of controlling a device as part of a real-time process and having a plurality of states, a system for driving a device to a particular state, the system includes: (1) a state machine monitor, associated with the device, that monitors a state of the state machine and (2) a device state controller, associated with the device and coupled to the state machine monitor, that drives the device to a particular state based on the state of the state machine, the state machine thereby freed of having to sequence-drive the device to the particular state. The device state controller may drive the device in an abnormal function. The state machine and the device may exist in different architectural layers within a hybrid real-time control system.

In yet another embodiment, for use with hybrid real-time control system having at least first and second architectural layers, a system for coordinating functions between the layers, includes: (1) inter-layer monitors, associated with objects within each of the architectural layers, that receive state and assignment information regarding devices in other architectural layers and (2) object controllers, coupled to the inter-layer monitors, that govern operation of blocks based on the state and assignment information. In various exemplary embodiments, the first layer may be selected from the group consisting of a unit executive layer and a device layer and the second layer may be a sequence layer.

The assignment information may include reservation information regarding whether a device associated with a monitored object has been reserved, the object controllers capable of reserving a device only when the reservation information indicates that the device is unreserved. The object controllers may be capable of ignoring requests from unauthorized objects. The object controllers may also contain information regarding a state previously attained by the objects. The object controllers are capable of changing mode in response to mode changes occurring in the other architectural layers.

In still another embodiment, the present invention provides a state machine capable of controlling a real-time process and having a stopped state and a transition to the stop state. The state machine includes a handler that provides a transition from the stopped state toward a running state, the handler allowing the state machine to recover from the stop state without having to abort from the stopped state. The stopped state may be an abnormal state and the handler may be embodied in a sequence of instructions executable in data processing and storage circuitry. The handler may be capable of being automatically invoked. The transition may lead to a configurable location in a sequence.

In yet another embodiment, the present invention provides a state machine capable of controlling a device as part of a real-time process. The state machine includes: (1) a first layer of exception and current transition and current step objects and (2) a second layer of condition, interrupt/step condition and output objects, the state machine thereby organized into a multi-object aggregation hierarchy.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which:

FIG. 1 illustrates a functional diagram of an exemplary distributed, real-time process control system with which the present invention may suitably be used;

FIG. 2 illustrates a high-level block diagram of an exemplary digital processing system that may be employed to execute software-definable process control routines embodying the principles of the present invention;

FIG. 3 illustrates a block diagram of an exemplary control architecture employing the principles of the present invention.

DETAILED DESCRIPTION

Figure 4:
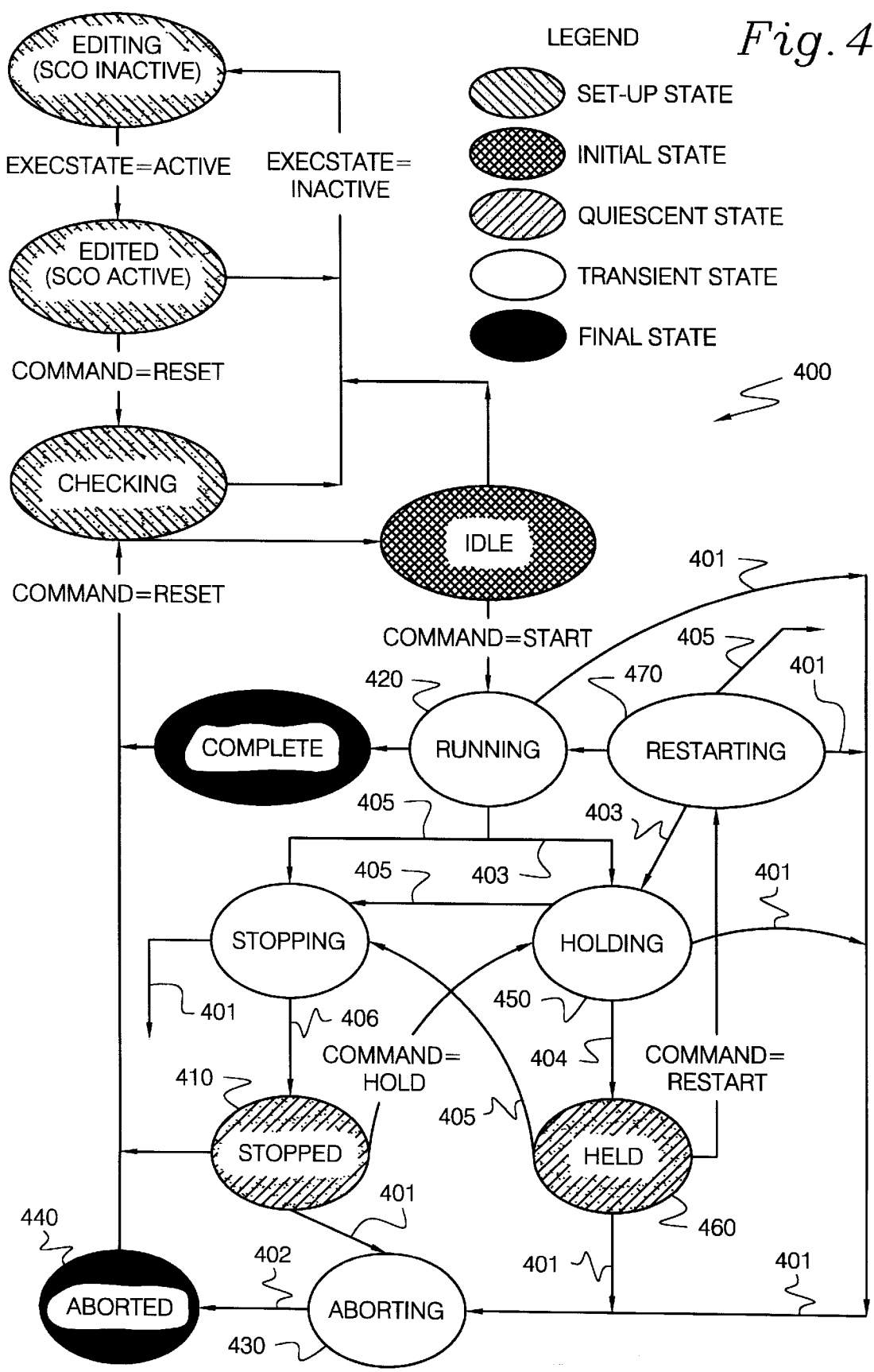
FIG. 4 illustrates an exemplary state diagram illustrating various process control states and features of the process control architectures disclosed by the present invention.

Before undertaking a description of the exemplary embodiments of the systems and methods of the present invention, it will be helpful to describe a computing or processing system environment in which the present invention may suitably be used or implemented. Referring initially to FIG. 1, illustrated is a functional diagram of an exemplary distributed, real-time process control system (generally designated 100) with which the present invention may suitably be used.

Process control system 100 illustratively includes a computer network having a server 110 and a controller network 111. The controller network 111 provides an interface between the server 110 and process controllers (generally designated 121); the controller network 111 may, for example, carry supervisory messages between the server 110 and process controllers 121, and peer-to-peer messages between the process controllers 121. The process controllers 121 communicate with input/output ("I/O") devices 122 via an I/O network 112. The process controllers 121 are adapted to execute software-definable process control routines for controlling and receiving data from process sensors and actuators 130 via I/O devices 122 and I/O network 112. Those skilled in the art are familiar with various types of process sensors and actuators 130, such as electrically-controllable motors, valves, pumps, etc., that may be employed in the manufacture of sundry products; the principles of the present invention are not limited to a specific process or processing system, however, but may readily be employed to advantage in any such system.

In one embodiment, the process control system 100 further includes a local area network ("LAN") 113 that provides an interface between the server 110 and remote workstations (generally designated 140). The remote workstations 140 may be used by system operators to control and monitor the operation of the process control system 100. Although illustrated as a separate network, the LAN 112 and controller network 111 may be the same; i.e., the remote workstations 140 and the process controllers 120 may share the same network transmission medium. Those skilled in the art will recognize, however, that providing separate networks for control systems and operator workstations may enhance the reliability of a distributed, real-time process control system; e.g., network traffic on LAN 112 associated with distributing process-related data from server 110 to operator workstations 140 will not interfere with process control information transmitted between server 110 and remote process controllers 120 via control network 111.

Software-definable process control routines may be executed by any digital processing system, such as server 110, workstations 140, or process controllers 121. FIG. 2 illustrates a high-level block diagram of an exemplary digital processing system 200 that may be employed to execute software-definable process control routines embodying the principles of the present invention. Exemplary digital processing system 200 includes a microprocessor 210, non-volatile memory 220, and random access memory ("RAM") 230. Non-volatile memory 220, which is employed to store software-definable process control routines, may comprise, for example, a programmable read-only memory ("PROM"), flash ROM, or a magnetic storage medium. The software-definable process control routines stored in non-volatile memory 220 are executed by microprocessor 210. The microprocessor employs RAM 230 to store all or portions of the process control routines as the routines are executed, as well as storage for process control data associated with process sensors and actuators 130. The description of exemplary digital processing system 200 is merely illustrative; those skilled in the art will recognize that software-definable process control routines employing the principles of the present invention are not limited to a specific hardware implementation for digital processing system 200, and that all such systems are within the scope of the claims recited hereinafter.

The present invention discloses a flexible and powerful architecture for hybrid real-time process control systems; various system architectures are disclosed for a state machine-based, hybrid real-time control system and methods of operation thereof. The real-time process control system may be implemented as software-defined process control routines executable by a digital processing system, such as server 110, workstations 140, or process controllers 121. Such software-defined process control routines are preferably implemented using object-oriented programming, wherein algorithms and their associated data can be implemented as objects called "blocks."

Referring now to FIG. 3, illustrated is a block diagram of an exemplary control architecture 300 employing the principles of the present invention. The exemplary architecture 300 includes a "unit executive" layer 310, a "sequence" layer 320, and a "device" layer 330. The device layer 330 includes device control blocks, generally designated 340, that control, for example, the operation of various devices (not shown; reference is made to process sensors and actuators 130 illustrated in FIG. 1), such as pumps, motors and valves used in a processing environment. The sequence, or "sequence control module" ("SCM"), layer 320 provides the sequence of steps and actions that operate the devices on and off in the right order and time sequence; e.g., the SCM layer 320 controls the execution of device control blocks 340. The function of the unit executive layer 310, which is similar to that of the SCM layer 320, is to coordinate the operation of more than one SCM. Thus, the unit executive layer 310, SCM layer 320, and device layer 330 form a hierarchical process control system, wherein a layer is operable to control, directly or indirectly, the operation of a lower layer, or control blocks within such lower layer.

The unit executive layer 310, SCM layer 320, and device layer 330 may be executed within a single digital processing system, such as server 110, workstations 140, or process controllers 121. Alternatively, the processing of layers may be distributed among the digital processing systems comprising the process control system; e.g., the unit executive layer 310 may be executed at the server 110, with an SCM layer 320 and device layer 330 being executed within each controller 121 under the direction of the unit executive. Those skilled in the art are familiar with the principles and techniques of distributed processing systems; the principles of the present invention are not limited to a particular distribution scheme, all such schemes being within the scope of the claims recited hereinafter.

An SCM layer 320 is a software entity that contains and executes sequencing logic. An SCM includes one or more "handlers," which are similar to subroutines; each handler is composed of a set of "transition" and "step" blocks. A transition block is similar to a conditional statement and gates the execution of the next step block; a step block is a set of executable statements written against process control variables and typically defined by a process engineer within his/her control domain.

FIG. 4 illustrates an exemplary state diagram 400 that defines various process control states; the transitions between the states are governed by the SCM layer 320. With respect to state diagram 400, the following notes are provided: (1) the Transition to Aborting 401 is via command or invoke condition; (2) the Transition to Aborted 402 is on completion of an abort handler; (3) the Transition to Holding 403 is via command or invoke condition; (4) the Transition to Held 404 is on completion of a hold handler; (5) the Transition to Stopping 405 is via command or invoke condition; (6) the Transition to Stopped 406 is on completion of a stop handler; and (7) where a "Command=" is shown, the transition must be commanded. With the exception of several unique transitions described hereinafter, the exemplary state diagram 400 conforms to the Instrument Society of America's ISA-dS88 standard for batch control. The principles of the present invention are not limited, however, to a particular state diagram or process; those skilled in the art will readily conceive of alternative state diagrams and/or processes that may employ the principles disclosed herein to advantage, such alternative embodiments being with the scope of the claims recited hereinafter.

One of the unique process control system architectural features disclosed by the present invention is the provision for "automatic handler invocation." The conventional methodology employed in the ISA-dS88 standard is to cause transitions between states by directing explicit commands to a sequence control object; the automatic handler invocation of the present invention does not require such explicit commands. Referring again to FIG. 3, an SCM layer handler 350 includes a first transition block 351, or "invoke transition," that monitors conditions of the real-time process and causes the automatic invocation of the handler 350 when the conditions match predetermined conditions under which the handler is to be invoked, thereby allowing the handler 350 to be invoked without an explicit command. The provisioning of automatic handler invocation allows for more decentralized processing, thereby enhancing the distributed nature and efficiency of the process control system. Table 1 provides an exemplary automatic handler invocation procedure coded in the C++ programming language.

TABLE 1

```
int clsCsco::DetectException (void)
{
        // Note: The InvokeTransition does not use the new Trans[].Ready() concept
        // (problems with steps in Edit could occur)
        // on the other hand, it could be verified that all first steps of a handler
        // are not in edit, before making the handler available for usage
        // this will leave the exception detection like it is and save CPU time.
        int iEvent = kHndTypeNull;      // 0 is interpreted as no event
        if((Mode != kManual) || (ExceptionModeOption==kExcModeAuto))
        {
                // exception conditions and commands are scanned with decrementing priority
                // currently index and priority are equivalent, which makes the code faster
                enmHandlerReason=kReasonUnknown;
                iThread = 0;
                assert((int)ScoCommand >=0);
                assert((int)ScoCommand <=kMaxHandlerType+1);
// +1 for Resume command (does not invoke handler),
                // but resumes from paused state
                // look for command
                if      (       (ScoCommand != kCmdNone)
//              &&      boEventEnabled[(int)ScoCommand]     // EventEnabled is propagated to HndCmdEnabled
                        &&      boHndCmdEnabled     [(int)ScoCommand])
                {
                        iEvent = (int)ScoCommand ;
                        enmHandlerReason = kReasonCommand;
                }
                int i=kMaxHandlerType;      // event type loop index
                // look for higher events than iEvent only
                while(i>iEvent)
                {
                        if (boHndCondEnabled[i]) // current enabled handlers
                        {
                                // check for command and/or conditions
                                // check for local condition of the external active location
                                if(     clsStep::kLocalExcCondExists[i]    )
                                {
```

TABLE 1-continued

```
            for(int t=0;t<ExtActiveLocation.nThreads;t++)
            {
                if( GlobalStatus&=Step[ExtActiveLocation.hStep[t]].Exception(i) )
                {
                    iEvent = i;
                    enmHandlerReason = kReasonLocalCond;
                    iThread = t;
                    break;
                }
            }
            if(enmHandlerReason == kReasonLocalCond)
                break;      // discontinue search for events
        }
                // check for global condition
            if    (kCscoGlobalCondition[i]      &&
((GlobalStatus&=Handler[hHandler[i]] .Ready(0))==clsPart::kPositive))
            {
                iEvent = i;
                enmHandlerReason = kReasonGlobalCond;
                break;           // discontinue search for events
            }
        }
        i--;
    } // end while      , no higher events found (no at all if iEvent==0)
    } // end if
    return iEvent;
}
```

Another unique process control system architectural feature disclosed by the present invention is the provision for "abnormal handler sequencing support." Referring again to FIG. 3, the device layer 330 includes a plurality of device control blocks, generally designated 340, that control, or monitor, the process sensors and actuators 130 as illustrated in FIG. 1. Conventional process control architectures employ "sequence-driven" handling of abnormal functions; i.e., if an abnormal event occurs during a process, a user-defined sequence, that may have the same capabilities as the SCM 320, can be executed based on the abnormal condition.

The abnormal handler sequencing support disclosed herein provides for "state-driven" abnormal functions. The SCM layer 320 includes a state machine capable of controlling a device (e.g., a process actuator 130) as part of a real-time process; the state machine has a plurality of states and it is desired to drive a device to a particular state. The system for driving a device to a particular state includes a state machine monitor 342 associated with the device, for example, as part of a device control block 340, that monitors a state of the state machine (e.g., the SCM layer 320), and a device state controller 343 that drives the device to a particular state based on the state of the state machine. The state machine (e.g., the SCM layer 320) is thereby freed of having to sequence-drive the device to the particular state.

The state machine and the device state controller may exist in different architectural layers within a hybrid real-time control system. For example, the sequence layer, or SCM layer, 320 functions as a state machine and the device layer 330 includes device control blocks 340 that include device state controllers 343. Thus, the provisioning of abnormal handler sequencing support allows for more decentralized processing, thereby enhancing the distributed nature and efficiency of a process control system. Table 2 provides an exemplary abnormal handler sequencing support procedure coded in the C++ programming language.

TABLE 2

```
void clsCfDigComp::AbnormalHandling( void )
    {
        // Determine if the present Status requires checking an abnormal
        // option.
    if ( pScmParameter->ScmState != LastScoState )
        {
            enmDdOptions     CheckOption = kDdOptNone;
            BOOLEAN     IsAbnormalOption = TRUE;
            int ResetOpStats = 0;
            switch ( pScmParameter->ScmState )
            {
                case kStsChecking:
                case kStsIdle:
                case kStsComplete:
                    CheckOption = StartOption;
                    break;
                            case kStsStopping:
                case kStsStopped:
                    CheckOption = StopOption;
                    break;
                case kStsHolding:
                case kStsHeld:
```

TABLE 2-continued

```
                CheckOption = HoldOption;
                break;
            // Can I check this any time state has changed and new state are these?
            case kStsRunning:
            // The code corresponding to Restarting should be executed when there is
            // transition of SCM from Held to Restart to Running. Hence the strange
            // construct
            if (LastScoState != kStsHeld)
            break;
                case kStsRestarting:
                case kStsRestarted:
                    IsAbnormalOption = FALSE;
                    if ( RestartOpt == kLastRequest )
                    {
                        if ((LastOpType == kOpTypeSet ) ||
                            ((LastOpType == kOpTypeNotStored) && (LastStep == ActiveStepId)))
                        {
                            OpRequest = LastOpRequest;
                            OpType = LastOpType;
                            ExtendedProcessing = TRUE;
                        }
                        else
                        {
                            ResetOpStats = 1;
                        }
                    }
                    break;
            // A Comm Error from monitoring the SCD will require
            // resetting OpRequest if OpType is NotStored.
            // A mechanism is required for when kStsCommErr resets.
            case kStsCommErr:
                IsAbnormalOption = FALSE;
                if (OpType == kOpTypeNotStored)
                {
                    ResetOpStats = 1;
                }
            default:
                break;
        }
        // check conditions of the Abnormal Option.
        // This should not be done for the restart option.
        if ( IsAbnormalOption &&
            ( (CheckOption == kDdOptSafeOp) ||
                ( (CheckOption == kDdOptNone) && (OpType == kOpTypeNotStored) )))
        {
            ResetOpStats = 1;
        }
        if ( ResetOpStats )
        {
            OpRequest = SafeOp;
            OpType = kOpTypeDefault;
            OpReqPending = TRUE;
            ExtendedProcessing = TRUE;
        }
    }   //pScmParameter->ScmState != LastScoState
    LastScoState = pScmParameter->ScmState;
}
```

Yet another unique process control system architectural feature disclosed by the present invention is the provision for "integration" of functions of the SCM layer 320 with functions of the device layer 330 and/or the unit executive layer 310.

For integration of the SCM layer 320 with the device layer 330, a key component of the SCM is its linkage with devices, which are built as function blocks within control modules, through the device layer 330. Of importance to this architectural feature, it is noted that an SCM preferably reserves a device before directing commands to it. The device tracks the SCM's unit assignment in order to report notifications against that unit. A device also validates control request commands sent to it in order to guarantee that only the identified SCM can change its state; commands from improper SCMs are rejected. A device can also detect SCM change of state, e.g., from a normal state to an exception state, and be configured to modify its behavior for safe process operation; behavior modification includes such things as setting its output to a safe value, which may be configured for each SCM abnormal state, as well as changing the mode of the device, e.g., to allow operator control, etc. In a preferred embodiment, the device drivers are "smart;" i.e., the drivers maintain information on last commanded normal configuration, which enables the devices to automatically return to a normal state when an abnormal condition is cleared. This integration between the device and sequence layers enables significant reduction in user engineering effort in designing and maintaining sequential control strategies.

Similar to the integration of the SCM layer 320 with devices through the device layer 330 is the integration of the SCM layer with a unit executive layer 310, which is not necessarily in the same control environment. Of importance to this architectural feature, it is noted that SCMs can be reserved by a unit executive layer 310 and that SCMs can monitor the state of the unit executive layer 310 and execute an abnormal handler. SCMs can also support unit assignment and identify the current assignment in all notifications generated by the SCM. Through the integration of the sequencing layer (i.e. SCM) 320 and the unit executive layer 310, the process control system enables users to effect unit-wide coordination through strategy configuration, thereby eliminating the common need for custom programming typically required to handle this function.

An exemplary system for "integration," or coordination of the functions, of layers includes: (1) inter-layer monitors, generally designated as 360, associated with other objects, generally designated as 370, within each of the architectural layers, that receive state and assignment information regarding objects in other architectural layers; and (2) object controllers, generally designated 380, coupled to the inter-layer monitors 360, that govern operation of blocks based on the state and assignment information.

The assignment information may include reservation information regarding whether a device associated with an object 370 has been reserved; the object controllers 380 are capable of reserving a device only when the reservation A further unique process control system architectural feature disclosed by the present invention is the provision for "return from stop execution." Referring again to FIG. 4, the ISA-dS88 state transition model includes an abnormal "stopped" state 410; the ISA-dS88 model does not, however, provide for a mechanism to return to the running state 420. To implement the "return from stop execution" architectural feature disclosed herein, the SCM layer 320 includes a handler that provides a transition from the stopped state 410 toward the running state 420; the handler allows the state machine 400 to recover from the stop state 410 without having to go through the aborting state 430 or aborted state 440. In one embodiment, the handler causes the state machine 400 to transition from the stopped state 410 by transitioning through the holding state 450, the hold state 460, and the restarting state 470 to return to the running state 420. The handler may be capable of being automatically invoked, for example, by embedding the commands to return to the running state 420 within the handler for the stopped state 410. TABLE 3 provides an exemplary return from stop execution procedure coded in the C++ programming language.

TABLE 3

```
//
//                          current handler      transient/final      event handler
const BOOLEAN kEventEnabled[kMaxHandlerType+1] [kStatesPerHandler] [kMaxHandlerType+1] = {
//Event Type                         Null    Edit    Main    Check   Int     Restart Hold    Stop    Abort
/* nulling */           {{          FALSE   ,FALSE  ,FALSE  ,FALSE  ,FALSE  ,FALSE  ,FALSE  ,FALSE
,FALSE}
/* nulled */             ,{         FALSE   ,TRUE   ,FALSE  ,FALSE  ,FALSE  ,FALSE  ,FALSE  ,FALSE
,FALSE}    }
/* editing */            ,{{        FALSE   ,FALSE  ,FALSE  ,FALSE  ,FALSE  ,FALSE  ,FALSE  ,FALSE
,FALSE}
/* edited */             ,{         FALSE   ,TRUE   ,FALSE  ,TRUE   ,FALSE  ,FALSE  ,FALSE  ,FALSE
,FALSE}    }
/* running */            ,{{        FALSE   ,FALSE  ,FALSE  ,FALSE  ,TRUE   ,FALSE  ,TRUE   ,TRUE    ,TRUE
}
/* complete */           ,{         FALSE   ,FALSE  ,FALSE  ,TRUE   ,FALSE  ,FALSE  ,FALSE  ,FALSE
,FALSE}    }
/* checking */           ,{{        FALSE   ,TRUE   ,FALSE  ,FALSE  ,FALSE  ,FALSE  ,FALSE  ,FALSE
,FALSE}
/* idle */               ,{         FALSE   ,TRUE   ,TRUE   ,TRUE   ,FALSE  ,FALSE  ,FALSE  ,FALSE
,FALSE}    }
/* interrupting */  ,{{  FALSE      ,FALSE  ,FALSE  ,FALSE  ,FALSE  ,FALSE  ,TRUE   ,TRUE   ,TRUE }
/* interrupted/ing */ ,{ FALSE      ,FALSE  ,FALSE  ,FALSE  ,FALSE  ,FALSE  ,TRUE   ,TRUE    ,TRUE
}       }
/* restarting */    ,{{  FALSE      ,FALSE  ,FALSE  ,FALSE  ,FALSE  ,FALSE  ,TRUE   ,TRUE   ,TRUE }
/* restarted/ing */ ,}   FALSE      ,FALSE  ,FALSE  ,FALSE  ,FALSE  ,FALSE  ,TRUE   ,TRUE   ,TRUE } }
/* holding */            ,{{        FALSE   ,FALSE  ,FALSE  ,FALSE  ,FALSE  ,FALSE  ,FALSE  ,TRUE    ,TRUE
}
/* held */               ,{         FALSE   ,FALSE  ,FALSE  ,FALSE  ,FALSE  ,TRUE   ,FALSE  ,TRUE    ,TRUE
}       }
/* stopping */           ,{{        FALSE   ,FALSE  ,FALSE  ,FALSE  ,FALSE  ,FALSE  ,FALSE  ,FALSE   ,TRUE
}
/* stopped */            ,{         FALSE   ,FALSE  ,FALSE  ,TRUE   ,FALSE  ,FALSE  ,TRUE   ,FALSE   ,TRUE
}       }
/* aborting */           ,{{        FALSE   ,FALSE  ,FALSE  ,FALSE  ,FALSE  ,FALSE  ,FALSE  ,FALSE
,FALSE}
/* aborted */            ,{         FALSE   ,FALSE  ,FALSE  ,TRUE   ,FALSE  ,FALSE  ,FALSE  ,FALSE
,FALSE}
                         };
``` information indicates that a device is unreserved. The object controllers 380 may be capable of ignoring requests from unauthorized objects. The object controllers 380 may also contain information regarding a state previously attained by an object 370. The object controllers 380 are also capable of changing mode in response to mode changes occurring in the other architectural layers.

In another aspect of the present invention, the SCM is, itself, provided with a hierarchical structure. The SCM parameters STATE and MODE show what the SCM is doing and how automatically it is being done, as explained previously. Further status information provided by the SCM is in two forms: status of the current scope of execution and status of the present configuration.

The SCM's status is the composite of all lower level statuses in the current scope of execution. This status is dynamic in that it changes when the SCM scope of execution changes; status from previous scope no longer has influence on the SCM's composite status. The SCM current scope of execution includes: (a) evaluated exception invoke Transitions, (b) evaluated (those enabled) transitions in the active handler and (c) all active steps in the active handler.

As the current scope changes as the SCM advances, transitions (e.g., "TransA") with bypassed conditions that previously caused the SCM execution status to go to "bypass," no longer influence the SCM's execution status. Instead, the status returns to a normal state, assuming all operations in the current scope are placed in a normal state. However, for as long as TransA's condition is bypassed, TransA's execution status assumes a bypass status.

The SCM's execution status is purely a function of the current scope of execution. When an SCM completes (goes to the complete state), the execution status is in a normal state, since nothing is currently being executed/evaluated. The same is true for the SCM state of Idle. Once the SCM is started again, the current scope of execution determines the value of SCM's execution status. If all operations are a normal state, then SCM's execution status is placed in a normal state, or if an enabled transition still has a bypassed condition, then SCM's execution status reflects that with a value of Bypass.

Per SCM object, status is provided related to the object's present configuration. This information is static and only changes when the SCM is inactivated or activated.

Parameters provided are: CONFIGSTS, CONFIGCODE and CONFIGDESC. These are directly analogous to the execution scope parameters EXECSTS, EXECCODE, EXECDESC, providing the a similar 2-level status indication and message.

The same hierarchical principles apply to the configuration status as described earlier for the execution status.

From the above, it is apparent that the present invention provides various system architectures for a state machine-based, hybrid real-time control system and methods of operation thereof. Although the present invention and its advantages have been described in detail, those skilled in the art should understand that they can make various changes, substitutions and alterations herein without departing from the spirit and scope of the invention in its broadest form.

What is claimed is:

1. For use with a state machine capable of controlling a real-time process within a process control system and having a plurality of states and handlers that govern transitions between ones of said plurality of states, a system for invoking one of said handlers, comprising:

an invoke transition, external to said one of said handlers, that monitors conditions of said real-time process and provides for state-driven abnormal functions by automatically invoking said one of said handlers when said conditions match a predetermined condition under which said one of said handlers is to be invoked, said invoke transition thereby allowing said one of said handlers to be invoked without providing an explicit command to a sequence control object.

2. The system as recited in claim 1 wherein said invoke transition is contained within a transition block of said one of said handlers.

3. The system as recited in claim 1 wherein said invoke transition is embodied in a sequence of instructions executable in data processing and storage circuitry.

4. For use with a state machine capable of controlling a real-time process within a process control system and having a plurality of states and handlers that govern transitions between ones of said plurality of states, a method of invoking one of said handlers, comprising the steps of:

monitoring at least one condition of said real-time process;

comparing, with an invoke transition that is external to said one of said handlers, a predetermined condition under which said one of said handlers is to be invoked with said at least one monitored condition; and providing state-driven abnormal functions by automatically invoking said one of said handlers if said at least one monitored condition matches said predetermined condition, whereby said one of said handlers is invoked without providing an explicit command to a sequence control object.

5. The method as recited in claim 4 wherein said predetermined condition is dynamically-altered as a function of a condition of said real-time process.

6. The method as recited in claim 4 wherein said steps of monitoring, comparing and automatically invoking are performed by executing a sequence of instructions in data processing and storage circuitry.

7. For use with a state machine capable of controlling a device as part of a real-time process within a process control system and having a plurality of states, a system for driving said device to a particular state, said system comprising:

a state machine monitor, associated with said device and external to said state machine, that monitors a state of said state machine; and a device state controller, associated with said device and coupled to said state machine monitor, that provides state-driven abnormal functions by driving said device to said particular state based on said state of said state machine, said state machine thereby freed of having to sequence-drive said device to said particular state by providing an explicit command to a sequence control object.

8. The system as recited in claim 7 wherein said device state controller drives said device in an abnormal function.

9. The system as recited in claim 7 wherein said state machine and said device exist in different architectural layers within a hybrid real-time control system.

10. For use with a state machine capable of controlling a device as part of a real-time process within a process control system and having a plurality of states, a method of invoking one of said handlers, comprising the steps of:

monitoring a state of said state machine with a state machine monitor that is external to said state machine; and providing state-driven abnormal functions by driving said device to a particular state based on said state of said state machine, said state machine thereby freed of having to sequence-drive said device to said particular state by providing an explicit command to a sequence control object.

11. The method as recited in claim 10 wherein said step of driving comprises the step of driving said device in an abnormal function.

12. The method as recited in claim 10 wherein said state machine and said device exist in different architectural layers within a hybrid real-time control system.

13. For use with hybrid real-time process control system having at least first and second architectural layers, a system for coordinating functions between said layers, comprising:

inter-layer monitors, associated with objects within each of said architectural layers, that receive state and assignment information of monitored objects in other architectural layers; and object controllers, coupled to said inter-layer monitors, that provides state-driven abnormal functions, subject to reservation of said objects, by governing operation of said objects based on said state and assignment information of said monitored objects.

14. The system as recited in claim 13 wherein said assignment information includes reservation information regarding whether devices associated with said monitored objects have been reserved, said object controllers capable of reserving said devices only when said reservation information indicates that said devices are unreserved.

15. The system as recited in claim 13 wherein said object controllers are capable of ignoring requests from unauthorized objects.

16. The system as recited in claim 13 wherein said object controllers contain information regarding a state previously attained by said objects.

17. The system as recited in claim 13 wherein said first layer is selected from the group consisting of a unit executive layer and a device layer and said second layer is a sequence layer.

18. The system as recited in claim 13 wherein said object controllers are capable of changing mode in response to mode changes occurring in said other architectural layers.

19. For use with hybrid real-time process control system having at least first and second architectural layers, a method of coordinating functions between said layers, comprising the steps of:

receiving state and assignment information of monitored objects in other architectural layers into each architectural layer; and providing state-driven abnormal functions by governing operation of objects based on said state and assignment information subject to reservation of said objects.

20. The method as recited in claim 19 wherein said assignment information includes reservation information regarding whether devices associated with said monitored objects have been reserved, said method comprising the step of reserving said devices only when said reservation information indicates that said devices are unreserved.

21. The method as recited in claim 19 further comprising the step of ignoring requests from unauthorized objects.

22. The method as recited in claim 19 further comprising the step of storing a state previously attained by said objects.

23. The method as recited in claim 19 wherein said first layer is selected from the group consisting of a unit executive layer and a device layer and said second layer is a sequence layer.

24. The method as recited in claim 19 further comprising the step of changing mode in response to mode changes occurring in said other architectural layers.

25. A state machine capable of providing state-driven abnormal functions by controlling a real-time process within a process control system and having a stopped state and a transition to said stop state, comprising:

a handler that provides a transition from said stopped state toward a running state, said handler allowing said state machine to recover from said stop state without having to abort from said stopped state.

26. The machine as recited in claim 25 wherein said stopped state is an abnormal state and said handler is embodied in a sequence of instructions executable in data processing and storage circuitry.

27. The machine as recited in claim 25 wherein said handler is capable of being automatically invoked.

28. The machine as recited in claim 25 wherein said transition leads to a configurable location in a sequence.

29. A method of operating a state machine capable of providing state-driven abnormal functions by controlling a real-time process within a process control system and having a stopped state and a transition to said stop state, comprising the steps of:

providing a transition from said stopped state toward a running state; and recovering said state machine from said stop state via said transition from said stopped state without having to abort from said stopped state.

30. The method as recited in claim 29 wherein said stopped state is an abnormal state and said method is carried out by executing a sequence of instructions in data processing and storage circuitry.

31. The method as recited in claim 29 wherein said step of recovering comprises the step of automatically invoking a handler.

32. The machine as recited in claim 29 wherein said transition leads to a configurable location in a sequence.

33. A state machine capable of providing state-driven abnormal functions by controlling a device as part of a real-time process within a process control system, comprising:

a first layer exception and current transition and current step objects; and a second layer of condition, interrupt/step condition and output objects, said state machine thereby organized into a multi-object aggregation hierarchy.

34. The state machine as recited in claim 33 wherein said condition objects of said second layer are associated with said exception transition objects of said first layer.

35. The state machine as recited in claim 33 wherein said condition objects of said second layer are associated with said current transition objects of said first layer.

36. The state machine as recited in claim 33 wherein said interrupt/stop condition objects of said second layer are associated with said current step objects of said first layer.

37. The state machine as recited in claim 33 wherein said output objects of said second layer are associated with said current step objects of said first layer.

38. A method of operating a state machine capable of providing state-driven abnormal functions by controlling a device as part of a real-time process within a process control system, comprising the steps of:

processing information relating to said real-time process in a first layer of exception and current transition and current step objects; and processing information relating to said real-time process in an associated second layer of condition, interrupt/step condition and output objects, said state machine thereby organized into a multi-object aggregation hierarchy.

39. The method as recited in claim 38 wherein said condition objects of said second layer are associated with said exception transition objects of said first layer.

40. The method as recited in claim 38 wherein said condition objects of said second layer are associated with said current transition objects of said first layer.

41. The method as recited in claim 38 wherein said interrupt/stop condition objects of said second layer are associated with said current step objects of said first layer.

42. The method as recited in claim 38 wherein said output objects of said second layer are associated with said current step objects of said first layer.

* * * * *